(12) United States Patent
Troppe

(10) Patent No.: US 10,204,116 B2
(45) Date of Patent: Feb. 12, 2019

(54) IMAGE METADATA ENRICHMENT GENERATOR

(71) Applicant: CoreLogic Solutions, LLC, Irvine, CA (US)

(72) Inventor: Patrick Louis Troppe, Arlington, VA (US)

(73) Assignee: CoreLogic Solutions, LLC, Irvine, CA (US)

( * ) Notice: Subject to any disclaimer, the term of this patent is extended or adjusted under 35 U.S.C. 154(b) by 334 days.

(21) Appl. No.: 15/018,664

(22) Filed: Feb. 8, 2016

(65) Prior Publication Data

US 2017/0228398 A1 Aug. 10, 2017

(51) Int. Cl.
*G06F 17/00* (2006.01)
*G06F 17/30* (2006.01)

(52) U.S. Cl.
CPC .. *G06F 17/30265* (2013.01); *G06F 17/30247* (2013.01); *G06F 17/30268* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 2005/0157173 A1* | 7/2005 | Kurebayashi | H04N 5/232 348/207.11 |
| 2009/0125560 A1* | 5/2009 | Munekuni | G06F 17/30265 |
| 2013/0182108 A1* | 7/2013 | Meadow | G06T 17/05 348/143 |

* cited by examiner

*Primary Examiner* — Tuan A Pham
(74) *Attorney, Agent, or Firm* — Knobbe, Martens, Olson & Bear, LLP

(57) ABSTRACT

Certain aspects relate to systems and techniques for image metadata enrichment. Image metadata enrichment can be accomplished by taking a variety of structured and unstructured data associated with an image and integrating some or all of the structured and unstructured data into the metadata of the image. The enriched image metadata renders the image capable of being placed against other leveraging technologies, for example searching and feature-based sorting.

16 Claims, 5 Drawing Sheets

IMAGE METADATA ENRICHMENT GENERATOR

TECHNICAL FIELD

The systems and methods disclosed herein are directed to digital image metadata, and, more particularly, to adaptively and automatically associating metadata with image files.

BACKGROUND

Various methods for search and retrieval of information, such as by a search engine over a network, typically employ text-based searching in which queried words or phrases are compared to an index or other data structure to identify webpages, documents, images, and the like that include matching or semantically similar textual content, metadata, file names, or other textual representations. Such methods of text-based searching work relatively well for text-based documents, however they are difficult to apply to image files and data.

Search engines and algorithms employed for text based searching cannot search image files based on the content of the image and thus, are limited to identifying search result images based only on the data associated with the images. Methods for content-based searching of images have been developed that utilize analysis of the content of the images to identify image features of the image and/or visually similar images. These methods, however, are inefficient and do not scale well to large-scale searches, wherein, for example, millions or even billions of images must be quickly searched to identify and provide search result images to a user. Thus, in order to search large databases of image files, a text-based query is typically required, necessitating that the image file be associated with one or more textual elements such as a title, file name, or other metadata or tags.

Typical image files, in addition to image content data, include limited textual information in the form of metadata. This conventional metadata includes attribute tags or information describing the image according to various standards, for example the Exchangeable Image File Format (EXIF) standard. EXIF data is widely used by many digital cameras to embed technical metadata into image files they create. A primary feature of EXIF is its ability to record camera information in an image file at the point of capture. Some common data fields include the camera make and model, its serial number, the date and time of image capture, GPS coordinates of where image capture occurred, the shutter speed, the aperture, the lens used and the ISO speed setting. EXIF metadata can include other technical details, such as white balance and distance to the subject. Other textual information associated with an image file is typically required to be input by a human.

SUMMARY

Although images typically include some textual metadata, as described above such metadata conventionally relates to technical details of the image file and not to the image content, while the image content may have more relevance to a search query. However, the relevant image content is not as readily searchable on a large scale as associated textual data.

The aforementioned problems, among others, are addressed in some embodiment by the image metadata enrichment generator described herein. The image metadata enrichment generator can take a variety of structured and unstructured data associated with an image and integrate some or all of the structured and unstructured data into the metadata of the image. The structured and unstructured data can include, for example, database records of an item depicted by the image, results of automated image feature recognition processes, data input by a user uploading the image, and image viewer tagging. As another example, the structured and unstructured data can include copyright management information, for example copyright notice, source, and/or creator. As a result, the baseline value of the image as a standalone asset can be increased, as the enriched image metadata renders the image capable of being placed against other leveraging technologies, for example searching and feature-based sorting.

Accordingly, one aspect relates to a system for generating enriched image metadata, the system comprising at least one data repository storing property record information about a real estate property and an image file representing an image depicting the real estate property, the image file including image content data and metadata; one or more processors configured with instructions to retrieve the image file and the property record information; access a keyword associated with the image file; identify, based on the keyword, a portion or element of the real estate property depicted in the image content data; identify at least a subset of the property record information associated with the portion or element of the real estate property to insert into the metadata of the image file; generate enriched image metadata by appending the identified subset of the property record information to at least one field of the metadata of the image file; and save, in the at least one data repository, the image file with image content data and the enriched image metadata.

Another aspect relates to non-transitory computer-readable medium storing instructions that, when executed, configure at least one processor to perform operations comprising accessing property record information about a real estate property; accessing an image file representing an image depicting the real estate property, the image file including image content data and metadata; accessing a keyword associated with the image file; identifying, based on the keyword, a portion or element of the real estate property depicted in the image content data; identifying at least a subset of the property record information associated with the portion or element of the real estate property to insert into the metadata of the image file; generating enriched image metadata by appending the identified subset of the property record information to at least one field of the metadata of the image file; and saving the image file with image content data and the enriched image metadata.

Another aspect relates to a computer-implemented method comprising accessing an image file including image content data and metadata; accessing copyright management information associated with the image file; generating enriched image metadata by appending the copyright management information to at least one field of the metadata of the image file; and saving the image file with image content data and the enriched image metadata.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1:
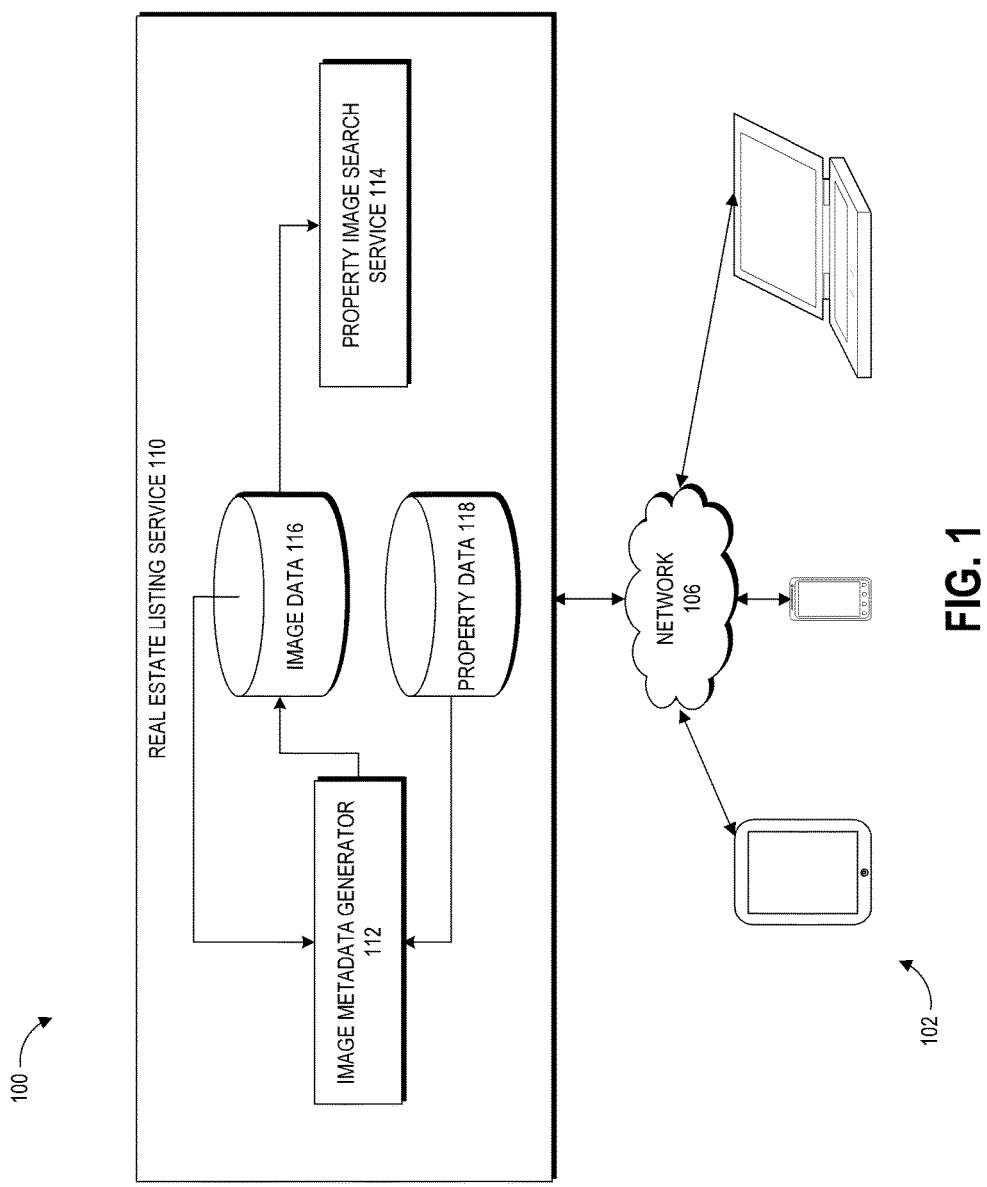
FIG. 1 depicts a schematic block diagram of an example system for providing and accessing metadata enriched according to the described systems and techniques.

Embodiments of the disclosure relate to systems and techniques for enriching image metadata. In some implementations, the disclosed systems and techniques can enrich imagery associated with real estate properties by populating the imagery's image metadata with content and values extracted from a property information system. To illustrate, some implementations can take a variety of structured and unstructured data associated with an image and integrate some or all of the structured and unstructured data into the metadata of the image. For example, the structured and unstructured data can include property database records of a lot or building depicted by the image, results of automated image feature recognition processes, data input by a user uploading the image, and image viewer tagging. As another example, the structured and unstructured data can include copyright management information, for example copyright notice, source, and/or creator. Such enriched image metadata increases the usability of the image as a standalone asset with respect to searching and feature-based sorting technologies.

As a result, image content has added value as it can be can be leveraged for discoverability by popular web search engines. In addition, a heightened integration is provided between imagery and related data, both structured and unstructured. Image content can be afforded more as intellectual property, and images can be used for additional uses associated with the presence of enriched image metadata. The added value comes from the imagery having machine readable content as an integrated part of the image data. Discovery and utilization of the image content, therefore, can occur directly against and with the image itself—not dependent upon separate data records (in various forms, including associated web pages) being present in order to associate and bring derived relevance to imagery content. This direct, rather than associated, content gives the image a more valuable role in all manner of searching, content storage and the taxonomy of search result displays.

The role of image metadata in SEO (Search Engine Optimization) is still evolving. One constant in the ever-growing sophistication and dynamic nature of search engine algorithms is the capitalization of data when present, including aggregate forms. Search engines' use of "long tail keywords" is one such example. A general lack of image metadata content that corresponds directly to search engine searches performed is arguably influential to image metadata not currently being a more prominent ingredient in SEO. This is not to say, however, that search engines do not utilize image metadata at all. For example, some search engines may incorporate the EXIF tag of an image into the search index, allowing users to locate the image based on the keywords included in this tag. Thus, image captions and image metadata descriptions with text can provide more relevant content for search engines to index. The disclosed image data metadata enrichment can make it easier to embed that content directly into the image files. Thus, as an example, a search engine user could search for photos of properties having three bedrooms priced under $X. As another example, a specialized property image search engine could be provided.

Presentation of search results can also leverage image metadata populated by the disclosed image data metadata enrichment systems and processes. This could come in the form of a pure image-based search result which pivots off of image metadata contents. As an example, a single image of a home might be part of separate search queries for "Colonial," "Viking Stove," "Pool," "Midnight Blue paint color," "granite counter tops," and "ACME Real Estate Brokerage Sales," as well as a commonly associated property address of "123 Main Street." Again, the presentation is facilitated and can even be established by population by enriched metadata rather than presence of and linkage to a separate data table or content.

The following example provides a high-level overview of the disclosed image metadata enrichment generator. A realtor or property owner can submit one or more photos of a property as part of an MLS listing submission. The disclosed image metadata enrichment generator, for example implemented via automated software running on a computing system, then uses the property's identifier (e.g., address, parcel number, or the like) to look up various types of information about the property, or such data can be sourced from the MLS submission itself. The looked up data, or certain types of it, can then be incorporated into the image's metadata. In some implementations, an automated analysis of the image can be performed to determine which types of the metadata to include. For example, different types of metadata may be inserted for outdoor versus indoor pictures.

As used herein, image and imagery can refer to both still images and digital videos including a number of frames, each frame of which can be considered as an image. In embodiments that involve enriching metadata associated with videos, the metadata of each frame or of groupings of similar frames can be populated with property information specific to the frame or grouping.

Several image file formats enable storage of metadata along with an image. Image metadata is information about or related to an image, for example, title, width, camera model, and artist, to name a few conventional metadata features. Windows GDI+ provides a uniform way of storing and retrieving metadata from image files in the Tagged Image File Format (TIFF), JPEG, Portable Network Graphics (PNG), and Exchangeable Image File (EXIF) formats. In GDI+, a piece of metadata is called a property item, and an individual property item is identified by a numerical constant called a property tag. Metadata can be stored and retrieved by calling the Image::SetPropertyItem and Image::GetPropertyItem methods of the Image class. Two of the many property items that are supported by Windows GDI+ include:

(1) PropertyTagImageDescription: A null-terminated character string that specifies the title of the image.

| Tag | 0x010E |
|---|---|
| Type | PropertyTagTypeASCII |
| Count | Length of the string including the NULL terminator |

(2) PropertyTagExifUserComment: A comment tag. A tag used by EXIF users to write keywords or comments about the image besides those in PropertyTagImageDescription and without the character-code limitations of the PropertyTagImageDescription tag.

| | |
|---|---|
| Tag | 0x9286 |
| Type | PropertyTagTypeUndefined |
| Count | Any |

To illustrate the described image metadata enrichment systems and techniques, consider the following example. A property information system can store and analyze a variety of static, dynamic, and derived data values associated with aggregated and individual real property records. System content can encompass everything from underlying land and parcel data to transactional and marketing data plus extensive imagery, from photographs, aerial and/or satellite imagery, floor plans, and more. The image metadata enrichment generator encompasses the selection and extraction of associated data from the property information system and subsequent population of that data into image metadata. This custom metadata information can be populated, in some embodiments, into the widely-used EXIF image metadata in recognition that EXIF is among the most prevalent image metadata types currently in use. Specifically, some embodiments can populate the information into the 'PropertyTagImageDescription' and 'PropertyTagExifUserComment' fields described above. However, the metadata enrichment systems and processes are not so limited to EXIF metadata and/or these specific fields. Other embodiments be altered to populate different image metadata types, populate different fields, or to create new fields specific to property records. For example the enriched metadata described herein can be used with the IPTC, IPTC Core & Extension, PLUS, XMP, and Dublin Core standard types of metadata.

The process of enriching the image with this additional image metadata can first occur at the point in which the image is uploaded into the property information system in some implementations. Typically, property record entries are created and subsequently one or more images are associated with such entries, and thus information from an associated property record entry can be used to populate property identifier information and other information into image metadata. For dynamic data that changes over time, such as property availability or pricing, the additional image metadata can be periodically updated, for example daily, weekly, or triggered by a change in the dynamic data.

The data selected for population into the image metadata can have ties back to the data record of the property depicted in the image, and can incorporate information from database fields which offer the greatest market value. Location information (e.g., address, postal/ZIP code, subdivision), property features (e.g., pool, granite counter tops, Viking appliances), property type information (e.g., Colonial, single family, multi-family, ranch) and even marketing factors (e.g., listing agent, valuation, source) could all have distinct applications made more complete or viable through the image metadata enrichment generator described herein. Image metadata values can also extend to elements identified through image recognition processes. Further, specific image metadata can be dynamically edited to reflect time sensitive or market-driven changes (e.g., days on market).

In some implementations, where the address information is not provided with an uploaded image, such information can potentially be determined by using GPS data associated with the image. For example, image GPS data can be analyzed in combination with map data to correlate the image location to a particular property location. Where the GPS coordinates do not clearly map to a particular property address (e.g., multiple possible matches are found), the image data can be compared to preexisting property images of known addresses to determine which one is correct.

Other embodiments may use existing image metadata or the results of automated image analysis to verify that user-input information is accurate. For example, to verify that a user correctly associates an uploaded image with a property record, latitude/longitude, GPS, or other location information stored in the image metadata can be compared with the latitude/longitude information of the property. As another example, features of an image identified from automated image analysis can be compared to user-input information including image category, appliance information, and the like to confirm that the user-input information is correct. In some embodiments, a user interface for uploading images can request a user to select from a menu of pre-selected options representing depicted image content rather than providing a free-form text entry in order to increase accuracy of user-input information.

In some embodiments, if additional information associated with an image file conflicts with the official property record information for the property associated with the image, this can cause a notification to be sent to a user alerting them to address the inconsistency. For example, the uploading user or a user on record as owning, managing, or otherwise associated with the property can receive the notification.

The image metadata enrichment generator can also be configured to populate image metadata differently into evolving image metadata constructs. For example, one implementation can populate image metadata into videos such that direct temporal metadata is populated into specific frames of the video, thus promoting visibility of an item on the video's timeline (and enabling "jumping" to that spot or instance by the viewer or search engine). Video is a powerful and ever-growing image-based communication and searched form—a form which has its own metadata. As an example, using metadata created using the disclosed image metadata enrichment, when a "Viking Stove" search criteria is submitted against a body of video-based content, the consumer of the search results can benefit from enriched metadata because the metadata enrichment generator has populated the sought-after attribute into the direct temporal metadata, which leads to a search result return of the specific frame containing the searched item (not just the broad-based title and description information).

Some examples of the disclosed metadata population techniques may use other data not specifically related to a property listing for populating image metadata. For example, the property database can include information about crime rates, school ratings, school names, climate, popularity of solar panels, home price growth or decline, and nearby grocery, shops, restaurants, care facilities, and the like. In some implementations, the metadata population techniques can populate this area-based property information into the metadata of images of properties within the area. Other implementations of the disclosed metadata population techniques may populate image metadata with ratings of a property, for example "good deal" or "overpriced," based on a comparison of appraisal or estimated property values to listing value. Some embodiments may be able to automatically generate a pre-appraisal value of a property based partly on automated analysis of images of the property, in combination with records of nearby property sales and price per square foot data. Other rating scales may also be included in metadata, for example relating to crime rate, walkability, and school district ratings.

Some implementations of the metadata population techniques can use information about trends in user behavior with respect to the property database to identify what fields of information to use for populating image metadata. For example, through analysis of aggregate user search histories, interaction with advertisements, viewing of specific types of images or images depicting certain content, and the like, the metadata population systems can identify property attributes that are of interest to users. Property attributes can include features of a real estate property or property area such as availability of solar panels, single story, fixer-upper, turnkey, low crime rate, proximity to coffee shops, high school ratings, and the like. In some embodiments, the frequency that keywords or fields from enriched image metadata are used by search engines to locate an image can be used to identify property attributes that are of interest to users. Information about a real estate property relating to the property attributes of interest can be included in the metadata of an image or group of images associated with the real estate property. The metadata population systems can periodically update a listing or property attributes of interest to users based on user behavioral trends, and accordingly image metadata can also be periodically updated corresponding to the evolving attributes interesting users of the property database system.

The image metadata enrichment systems and processes are primarily described herein with respect to property or real estate. However, the systems and processes are generally applicable to any digital catalog of items, for example manufacturing catalogs, apparel catalogs, or other retail catalogs. For example, an image inventory of a mechanical parts manufacturer's goods could be cataloged in a way that a matched or found image in response to a search query—with populated image metadata—could be a stand-alone source of part specifications and ordering information. For example, an image-based part or item catalog search service can be provided that receives an uploaded image from a user, illustratively of a part which the user needs to replace or reorder. The search service can match the uploaded image to the image of a part or item in the catalog and retrieve a serial number or other identifying information from the metadata of the part or item. The serial number or other identifying information can be provided to the user for ordering the part or item, or can be used to automatically add the part or item to an electronic cart, to name a few examples.

Indeed, any manufacturer or provider of a good or service could use the systems and techniques of the present disclosure to have details embedded as a part of an image, rather than linked to a separate data record. This can address the problem where details of an imaged item are unassociated with the image so a viewing potential customer does not have enough information, based on the viewed image alone, to initiate a transaction or perform a verification because such data is not a part of the image. As an additional example, the disclosed techniques can be used to populate patient information into medical image metadata. Further, copyright management information can be populated using the disclosed techniques into metadata of an image of any type, for example retail item images, artistic images, professional photographic images, scientific images, and the like.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Example Image Metadata Enrichment Systems and Techniques

FIG. 1 depicts a schematic block diagram of an example network environment 100 in which features can be implemented for generating and accessing enriched image metadata enriched. The network environment shown in FIG. 1 includes various user devices 102 and a real estate listing service 110. The system components may communicate with each other via one or more communication networks 106 in order to deliver images with enriched metadata hosted on real estate listing service 110 to user devices 102, for example in the form of search results from the property image search service 114, and/or to deliver uploaded images from user devices 102 to the real estate listing service 110. The network 106 may be a publicly accessible network of linked networks, possibly operated by various distinct parties, such as the Internet. In other embodiments, the network 106 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102. The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

Individual user devices 102 may execute an application to communicate via the network 106 with other computing systems, such as the real estate listing service 110, in order to request and display content. Some user devices 102 may include imaging technology, and users can capture images of a property for upload to the real estate listing service 110. Such imaging technology of user device 102 may be adapted to populate conventional EXIF data into captured image data, for example including date and time of image capture, GPS coordinates of where image capture occurred, camera specifications, and image capture settings. The user may be a real estate broker, consumer, appraiser, appraisal company, lender, investor, or the like.

The real estate listing service 110 can be a computing system configured to communicate property content with user devices 102 and generate enriched metadata as described herein. For example, the real estate listing service 110 can be a server or group of servers that may be accessed via the network 106. The real estate listing service 110 may include various modules, components, data stores, and the like to provide the metadata enrichment functionality described herein. For example, real estate listing service 110 can include data storage in the form of property data repository 118 and image data repository 116. Although depicted as separate databases, some of these data collections may be merged into a single database or distributed across multiple distinct databases. Real estate listing service 110 can include image metadata generator 112 and property image search service 114. In some embodiments, image metadata generator 112 and property image search service 114 can be implemented as one or more processors with computer executable instructions to perform the metadata enrichment and image searching features described below.

The property data repository 118 may be one database or may include a plurality of databases. In an embodiment, the real estate database includes a database which includes data gathered from various real estate databases including, but not limited to, a Multiple Listing Service (MLS) database, a Tax Roll Database, a Real Estate Owned (REO) database, an Automated Valuation Model (AVM) database, and/or any other related real property databases. The property data repository 118 can store aggregated property data. Property data can include public recorder data, underlying land and parcel data, transactional and marketing data, residence data (for example, number of bedrooms, bathrooms, square footage), property features (for example, pool, fenced yard, corner lot), and any data relating to land and/or buildings.

Image data repository 116 can store images associated with properties in the property data repository 118. Images can be photographs, aerial and/or satellite imagery, floor plans, and more. The images can be supplied by users or gathered from other property records. Though not illustrated, real estate listing service can include a user interface for an upload service by which users can upload images of property. Images received via the upload service can be stored in the image data repository 116 and associated with a property identified in the property data repository 118.

Image metadata generator 112 can correlate portions or all data associated with a property in the property data repository 118 with an image. For example, one implementation can identify a property record depicted by the image, identify textual information associated with the property record, and insert the textual information into the image metadata (for example into the EXIF data). In some implementations, additional information associated with an image can be used to automatically identify a subset of property record information to insert into the image metadata. For example, such additional information can be keywords, categories, or other data can be associated with the image by a user during upload. Such additional information can additionally or alternatively be keywords and phrases associated with the image based on results of automated image feature analysis, or data generated by users viewing the image. The image metadata generator 112 can use the additional information to identify a subset of the property data of the depicted property that is more relevant to the image, and can insert only the identified subset of property data into the image metadata.

To illustrate, consider the following examples. In one example, an uploading user could select a category or input a keyword of "kitchen" with an image depicting property X. The image metadata generator 112 can retrieve the "kitchen" category/keyword of additional information associated with the image, incorporate the word "kitchen" into the image metadata, and can further identify a subset of the property data of property X relating to the kitchen at property X, for instance including information on appliances. The identified subset of kitchen information can be inserted into the image metadata. In another example, automated image analysis may indicate that a pool is likely to be present in image of property Y. The image metadata generator 112 can retrieve the "pool" keyword of additional information associated with the image, incorporate this keyword into the image metadata, and can optionally further identify a subset of the property data of property Y related to pools to insert into the metadata. As another example, users viewing the image via the real estate listing service 110 may be able to tag the image with keywords, categories, and the like. The information provided by tagging users can be incorporated into the image data, and in some implementations may be subject to verification prior to incorporation.

Users can browse real estate listings provided by the real estate listing service 110 by querying the property image search service 114. Property image search service 114 can operate to correlate keywords in image metadata enriched by the image metadata generator 112 to identify property images from image data repository 116 to return in response to a user query. For example, a user can search "3 bedroom home under $1,500,000 in City X" and the property image search service 114 can use enriched image metadata to return images of matching properties to the user. In some embodiments, the images can be presented to the user in sets or groupings such that images of a single property are clustered together. In other embodiments, a representative image of each property can be selected for presentation to the user, for example based on the enriched metadata of the image correlating with the search query provided by the user.

In other embodiments of the enriched metadata described herein, other electronic catalogs besides property listings can be searchable based on enriched metadata. Accordingly, the above-described data repositories and search service can be modified to adapt to other types of data and associated images, for example retail catalogs and retail item images, machine catalogs and part images, and the like.

Figure 2:
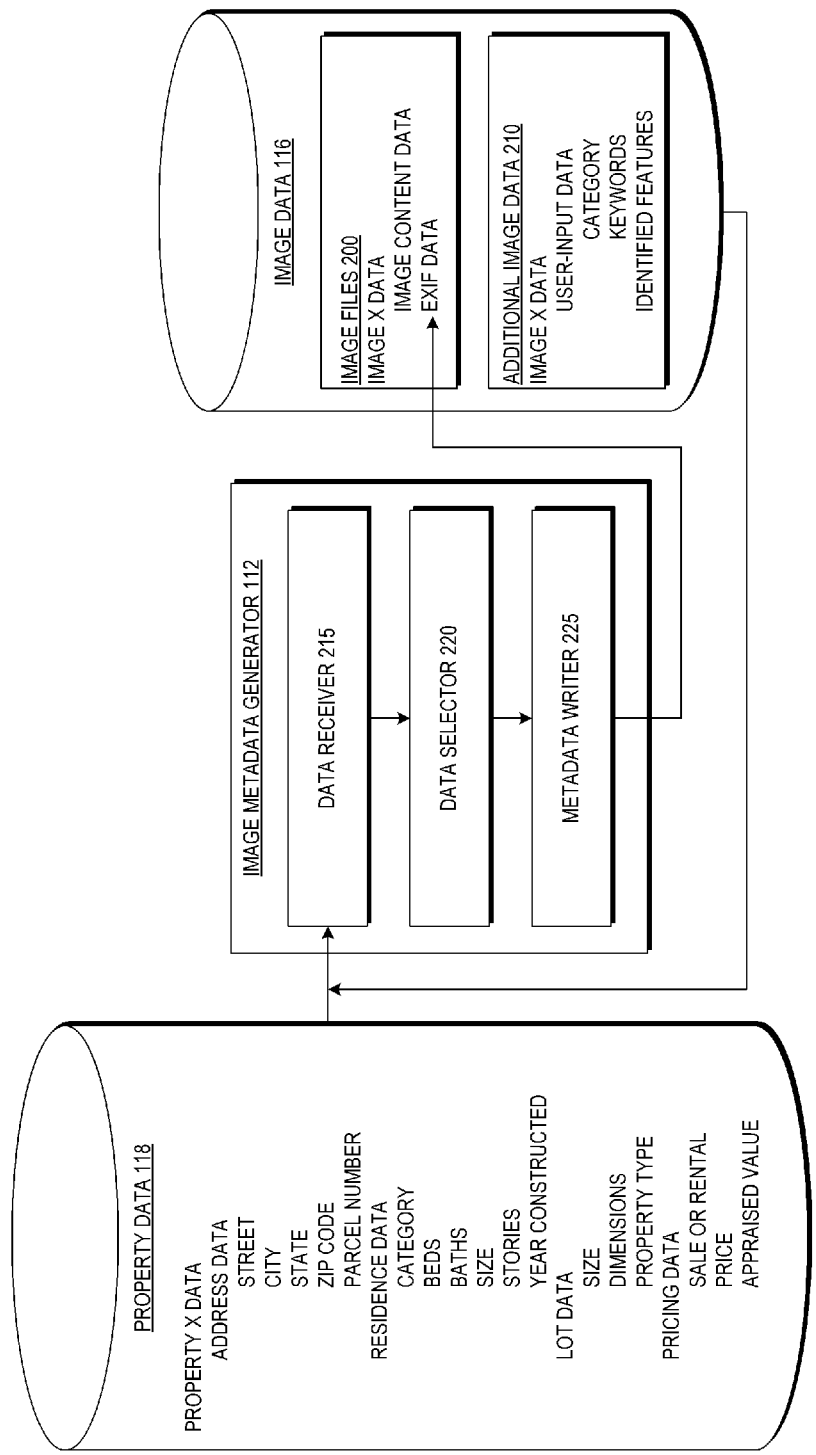
FIG. 2 depicts an example of data that can be used for the described image metadata techniques.

FIG. 2 depicts an example of data that can be used for the described image metadata techniques. As illustrated, data relating to property X can be stored in the property data repository 118 including address data, residence data, lot data, and pricing data. Address data can be, for example, street, city, state, zip code, parcel number, and the like. Residence data can be category (residential/commercial/industrial/mixed use), number of bedrooms and/or bathrooms, size or square footage, number of stories, and year constructed, to name a few examples. Lot data can include size, dimensions, and property type, among other features. Pricing data can include, as illustrated, whether property X is a sale or rental, pricing, and appraised value, and can also include other pricing features like sale history and estimated value.

The image data repository 118 can store a number of image files 200 including image X data of an image depicting property X. Image X data can include both image content data representing the depicted property and also EXIF data including conventionally populated fields (for example, camera model, time and date of image capture, GPS data, and the like). The image data repository 118 can also store optional additional image data 210 associated with image X data. The additional image data 210 can include user-input data provided during upload of image X or provided by viewing users, for example category or keywords, and can also include features identified via automated image analysis. The additional image data 210 can additionally or alternatively include copyright management information, for example copyright notice, source, and/or creator. In some embodiments, the image metadata generator may first receive only the image X data unassociated with a specific property in the property data repository and can use any GPS data in the image EXIF data to identify the associated property, or can associate the copyright information with the unassociated image X data.

Though not illustrated, some embodiments may additionally draw data covering an area including a number of different real estate properties from a real estate database. For example, the property database can include information about crime rates, school ratings, school names, climate, popularity of solar panels, home price growth or decline, and nearby grocery, shops, restaurants, care facilities, and the like.

A data receiving component 215 of the image metadata generator 112 can receive some or all of the property X data, image X file 200, and additional image data 210. This data can be passed to the data selector 220, which can identify some or all of the property X data and additional image data 210 to incorporate into the image X metadata, for example into the EXIF data of image X. In some embodiments, all of the property X data and the additional image data 210 can be included in the EXIF data, thereby generating the enriched image metadata described herein. In some embodiments, a subset of the property X data and/or the additional image data 210 can be included in the EXIF data. For example, certain fields of property data may be automatically included in EXIF data of all images depicting a property. Some embodiments can correlate portions of the property X data with the additional image data 210 to identify a subset of the property X data to include in the EXIF data. Some embodiments can combine automatically included fields and other identified fields for inclusion in the image EXIF data. The metadata writing component 225 can include the identified portions of the property X data and additional image data 210 in the EXIF data of the image and can save the enriched metadata to the image file 200.

Figure 3:
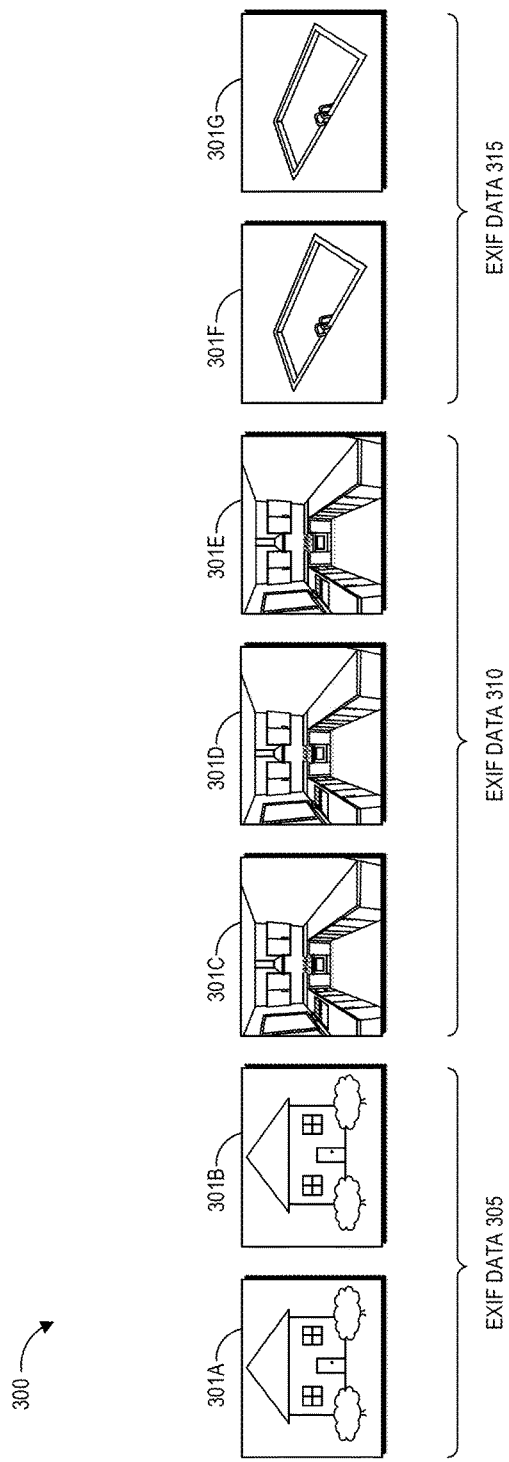
FIG. 3 depicts an example of metadata associated with frames in a video.

FIG. 3 depicts an example 300 of metadata associated with frames in a video. As illustrated, the metadata of groupings of similar frames is populated with property information specific to the grouping, as EXIF data 305 is provided for both frames 301A and 301B depicting the exterior of a home, EXIF data 310 is provided for frames 301C-301E depicting the kitchen of the home, and EXIF data 315 is provided for frames 301F and 301G depicting the pool of the home. The numbers of frames in each grouping are provided for example only and one or more frames can be included in a grouping of frames provided with similar or the same enriched metadata.

As illustrated by the example 300, the techniques described herein can populate image metadata into videos such that direct temporal metadata is populated into specific frames of the video, thus promoting visibility of an item on the video's timeline (and enabling "jumping" to that spot or instance by the viewer or property image search service 114). As an example, using metadata created using the disclosed image metadata enrichment, when a query is submitted against a body of video-based content, the consumer of the search results can benefit from enriched metadata because the metadata enrichment generator has populated the sought-after attribute into the direct temporal metadata, leading to a search result return of the specific frame containing the searched item (not just the broad-based title and description information).

Figure 4:
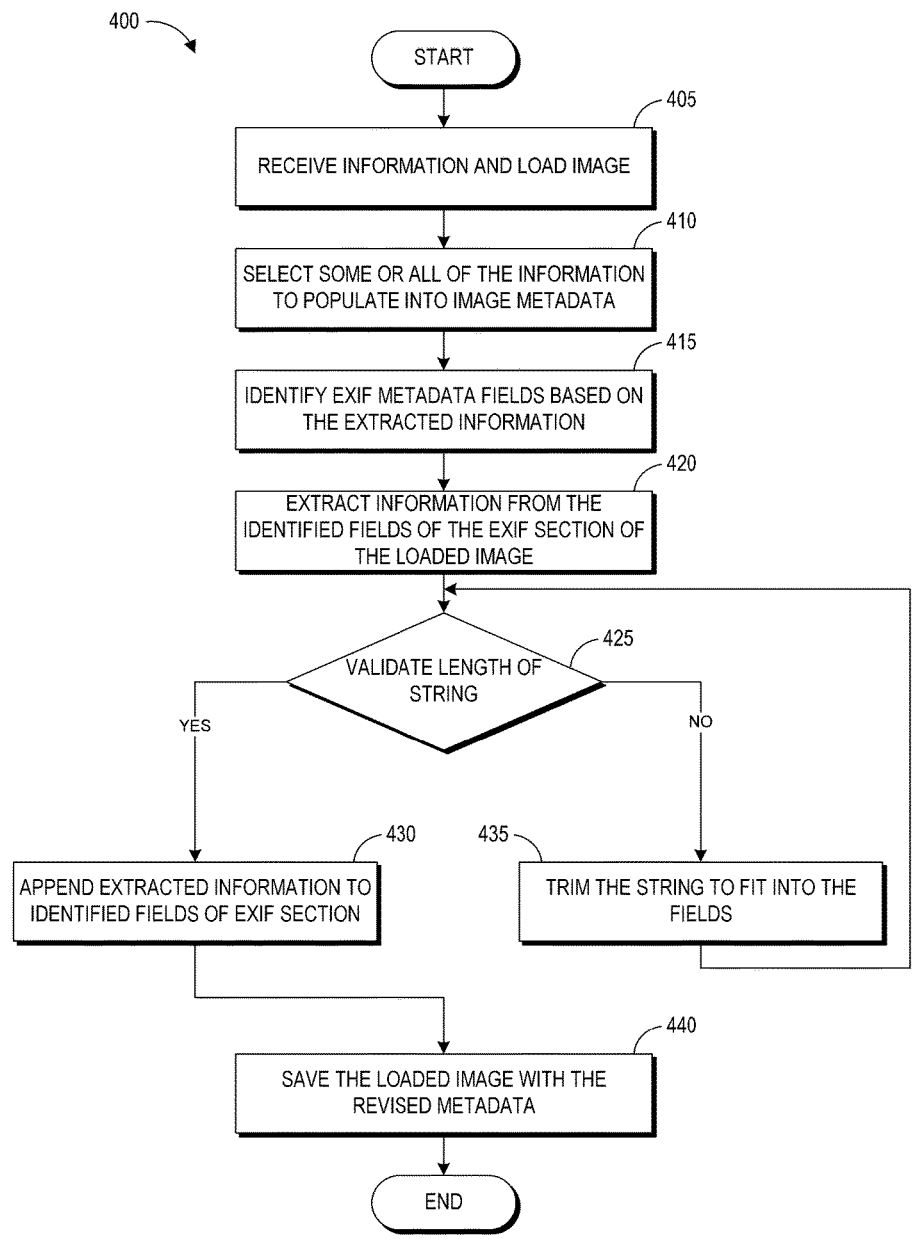
FIG. 4 depicts a flowchart of one example of an image metadata enrichment process.

FIG. 4 depicts a flowchart of one example of an image metadata enrichment process 400 that can be implemented by the image metadata generator 112 in some embodiments. Inherent to the image metadata enrichment generator is an understanding that image metadata types, fields and schemas are evolving. While the particular examples of process 400 described below illustrates how content can be populated into certain EXIF fields, the process 400 is not limited to the population of content into only specific fields.

At block 405, the process 400 receives information and loads image data. As described above, the information can include information relating to a specific property record associated with the image, keywords or features based on automated image analysis, area-based property information, and additional user-provided information associated with the image. The information can additionally or alternatively include copyright management information. The image data can include standard metadata fields.

At block 410, the process 400 selects some or all of the property record data, copyright management information, area-based property information, and/or additional user-provided information to populate into the image metadata. For example, as described above, certain portions of the property record data may be automatically selected to populate into metadata of any image associated with the property in some embodiments. In other embodiments user-provided information or automatically extracted features can be correlated with the property record data to identify a subset of the property record data to include in the metadata. In further embodiments, identified property attributes that interest a group of users can be used to select a subset of the property record data, area-based property information, and/or additional user-provided information to populate into the metadata.

At block 415, the process 400 can identify EXIF metadata fields based on the extracted information. The process 400 can anticipate the selection and designation of "destination" metadata type and field(s). As such, and within context of the given example, the process 400 recognizes the potential for independent thought to be applied. This independent thought can be driven by strategic/creative aspects (such as logical associations), tactical/usage aspects (such as perceptions about more commonly read image metadata types), or operational aspects (such as support of language-specific characters or character count limits, even though these limits are not present in the more flexible XMP image metadata). Selection of fields for population of additional content can, for instance, prevent overwriting of values with generally accepted logical relationships (e.g., fields for exposure settings) and a desire to prevent a need to trim populated values to stay within character limits.

At block 420, the process 400 can extract information from the identified fields of the EXIF section of the loaded image. Specifically, some embodiments can extract the information from the 'PropertyTagImageDescription' and 'PropertyTagExifUserComment' fields described above.

At decision block 425 the process 400 can validate the length of the extracted string. For example, the number of characters in the string can be compared to a predetermined threshold associated with the field from which the information was extracted. The extracted string can include the information extracted from the existing EXIF field and also the additional property information identified for creating the enriched metadata.

If the process 400 determines that the length of the string is not below the threshold length value and thus not validated, then the process 400 transitions to block 435 to trim the string to fit into the field. For example, the process 400 can prioritize property data over camera specifications and image capture settings in some embodiments so that the final metadata is more useful in the context of a property image search. The trimmed string can be sent back to block 425 for further validation. In such embodiments if the trimmed string still exceeds the threshold, the process 400 can identify prioritized portions of the property data to include and un-prioritized portions to trim. This process can be iterated until the trimmed string validates by having less than the threshold number of characters.

If the process 400 determines that the length of the string is below the threshold length value and thus validated, then the process 400 transitions to block 430 to append the extracted information to the identified fields of the EXIF section. Specifically, some embodiments can populate the information into the 'PropertyTagImageDescription' and 'PropertyTagExifUserComment' fields described above. However, the metadata enrichment systems and processes are not so limited to EXIF metadata and/or these specific fields. Other embodiments be altered to populate different image metadata types, populate different fields, or to create new fields specific to property records.

At block 440, the process 400 saves the image with the revised, enriched metadata.

Figure 5:
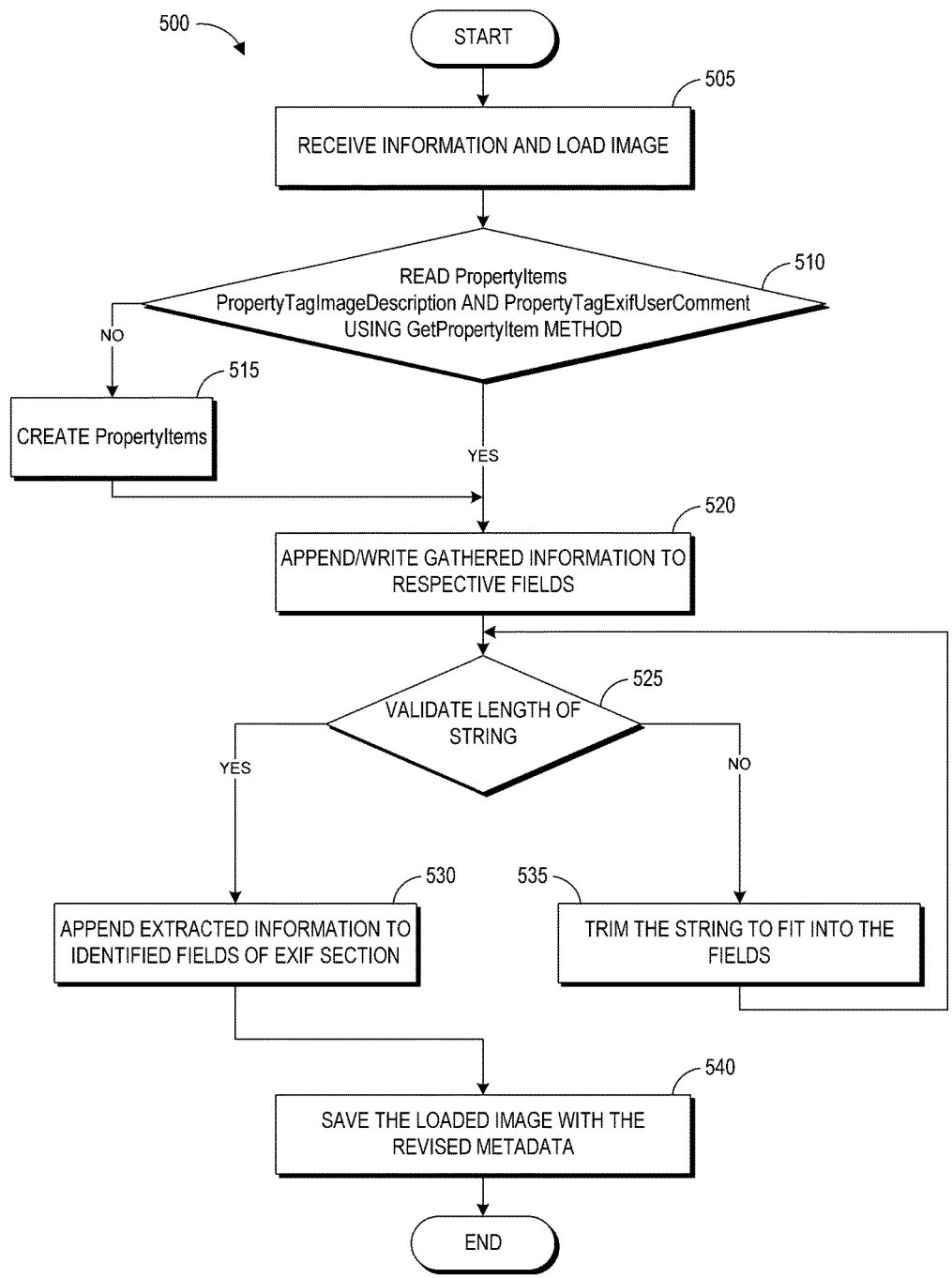
FIG. 5 depicts a flowchart of another example of an image metadata enrichment process.

FIG. 5 depicts a flowchart of another example of an image metadata enrichment process 500 that can be implemented by the image metadata generator 112 in some embodiments. The process 500 can operate to write enriched metadata for EXIF fields that are not already written to the data of an image file. While the particular examples of process 500 described below illustrate how content can be populated into certain EXIF fields, the process 500 is not limited to the population of content into only specific fields.

At block 505, the process 500 receives information and loads image data. As described above, the information can include information relating to a specific property record associated with the image, keywords or features based on automated image analysis, area-based property information, and additional user-provided information associated with the image. The information can additionally or alternatively include copyright management information. The image data can include standard metadata fields. This process can also include selection of some or all of the property record data and/or additional user-provided information to populate into the image metadata, as described above with respect to block 410 of FIG. 4.

At decision block 510, the process 500 can use the GetPropertyItem method to read the PropertyItems in the image metadata. Specifically, some embodiments can look for the 'PropertyTagImageDescription' and 'PropertyTagExifUserComment' fields described above.

If the 'PropertyTagImageDescription' and 'PropertyTagExifUserComment' fields are not already in the image metadata, the process 500 transitions to block 515 to create these property items. In other embodiments, other property items can be looked for and/or created based on metadata fields that are widely used or adopted for specific purposes such as providing enriched property image metadata.

If the 'PropertyTagImageDescription' and 'PropertyTagExifUserComment' fields are already in the image metadata, the process 500 transitions to block 520 to extract the existing information from the respective fields and append the gathered information to the respective fields to create a new string of enriched metadata.

At decision block 525 the process 500 can validate the length of the extracted string. For example, the number of characters in the string can be compared to a predetermined threshold associated with the field from which the information was extracted. The extracted string can include the information extracted from the existing EXIF field and also the additional property information identified for creating the enriched metadata.

If the process 500 determines that the length of the string is not below the threshold length value and thus not validated, then the process 500 transitions to block 535 to trim the string to fit into the field, as described above with respect to blocks 425 and 435 of FIG. 4. This process can be iterated until the trimmed string validates by having less than the threshold number of characters.

If the process 500 determines that the length of the string is below the threshold length value and thus validated, then the process 500 transitions to block 530 to append the extracted information to the identified fields of the EXIF section. Specifically, some embodiments can populate the information into the 'PropertyTagImageDescription' and 'PropertyTagExifUserComment' fields described above. However, the metadata enrichment systems and processes are not so limited to EXIF metadata and/or these specific fields. Other embodiments be altered to populate different image metadata types, populate different fields, or to create new fields specific to property records.

At block 540, the process 500 saves the image with the revised, enriched metadata.

Overview of Example Image Metadata Enrichment Algorithm

Below is an overview of nine example steps that can be used in one embodiment of an image metadata generator as described herein. Each step includes a high level overview of the function of the step followed by example features that can be used to implement the function.

1. Sets the property items to the stream of type image
    <param name="srcImageStream">source Stream object of type image</param>
    <param name="propItems">Desired property items that needs to be set to the image</param>
    <returns>Stream object after setting the property items that are passed to this method. If any exception occurs during setting the property items, it returns null</returns>
    public static Stream updateImagePropertyItemToStream (Stream srcImageStream, PropertyItem[ ] propItems)

2. Sets the property items using the image object that is passed to this method and saves it as new image in the location specified by parameter filePath.
    <param name="srcImageObj">Source image object</param>
    <param name="propItems">Desired property items that needs to be set to the image</param>
    <param name="filePath">Physical path of the file (including file name with extension) to save the image</param>
    <returns>True if property items are set to image and saved in the location specified by filePath, else returns false and image will not be saved in the specified location</returns>
    public static bool updateImagePropertyItemToImage(Image srcImageObj, PropertyItem[ ] propItems, String filePath)

3. Sets the property items to Image
    <param name="srcImageObj">Source image object</param>
    <param name="propItems">Desired property items that needs to be set to the image</param>
    <param name="imageFormat">Image Format of the source image</param>
    <returns>Returns image object if the property items are successfully set to the returned image object, else returns null</returns>
    public static Image updateImagePropertyItemToImage (Image srcImageObj, PropertyItem[ ] propItems, ImageFormat imageFormat)

4. Checks for the valid property items in the array of property items that is passed to this method.
   <param name="propItems">array of property items that needs to be checked</param>
   <returns>True if all the items in the array are valid property items, else returns false</returns>
   public static bool isValidPropertyItem(PropertyItem[ ] propItems)
5. Checks for the valid property item ID that is passed among the valid property items
   <param name="propID">An Integer value that needs to be validated against valid property items ID</param>
   <returns>True if the passed in integer value is a valid property item ID, else returns false</returns>
   public static bool isValidPropertyItemConstant(int propID)
6. Creates a property item with passed in valid property item ID and property item value
   <param name="propID">Valid property item ID that needs to be created</param>
   <param name="propValue">Value of the property item that needs to be set to the passed in property item ID</param>
   <returns>Property Item that is created if passed in property item ID is valid, else returns null</returns>
   public static PropertyItem createPropertyItem(int propID, String propValue)
7. Reads the property item from the passed in image object
   <param name="srcImageObj">Image object that needs to be read to retrieve property item value specified by property item ID</param>
   <param name="propID">Valid property item ID</param>
   <returns>Value of the specified property item from the image that is passed to this method. For any reason like invalid property item ID or invalid image, it returns empty string</returns>
   public static String getPropertyItemValueFromImageStream(Image srcImageObj, int propID)
8. Creates the image object from the file path that is passed to this method
   <param name="filePath">A valid file path including filename with file extension</param>
   <returns>Image object if the given filePath is a valid file path and image file exists in the specified location, else returns null</returns>public static Image createImageObjectFromFile(String filePath)
9. Generates new image file path from the existing image file path. This file path include file name with file extension
   <param name="existingFilePath">A valid file path to the existing file including file name and file extension</param>
   <returns>A new file path (including file name with file extension) to the file in the same directory of existing file path. New file name will be '{[old file name]_[editedMetadata].[file extension]}'</returns>
   public static String generateNewImageFilePath(String existingFilePath)

Implementing Systems and Terminology

Implementations disclosed herein provide systems, methods and apparatus for enriching image metadata. One skilled in the art will recognize that these embodiments may be implemented in hardware, software, firmware, or any combination thereof.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for generating enriched image metadata, the system comprising:
at least one data repository storing property record information about a real estate property and an image file representing an image depicting the real estate property, the image file including image content data and metadata;
one or more processors configured with instructions to:
determine that a user has uploaded the image file of the real estate property together with providing a keyword associated with the image file;
retrieve the property record information;
identify, based on the keyword, a portion or element of the real estate property that is depicted in the image content data;
identify a subset of the property record information that correlates with the portion or element of the real estate property that is depicted in the image content data;
identify a metadata field of the metadata, wherein the metadata field embeds technical metadata relating to image capture into the metadata;
generate enriched image metadata by appending the identified subset of the property record information in a machine readable format to the metadata field of the metadata of the image file, wherein generating the enriched image metadata comprises extracting existing technical metadata from the metadata field and appending the subset of the property record information to the existing technical metadata; and
save, in the at least one data repository, the image file with image content data and the enriched image metadata;
wherein the image file comprises one of a plurality of frames along a timeline of a video depicting the real estate property, and the one or more processors are further configured to:
receive a query for the keyword from a property image search engine of a real estate listing service;
access the enriched image metadata to identify the image file as a match to the query; and
return the video with search results for the query, wherein the video in the search results is jumped to the image file.

2. The system of claim 1, further comprising a real estate listing service hosted on one or more servers.

3. The system of claim 2, wherein the real estate listing service comprises the at least one data repository and the one or more processors.

4. The system of claim 2, wherein the real estate listing service comprises a property image search service.

5. The system of claim 4, wherein the property image search service is accessible via a network to a user device.

6. The system of claim 5, wherein the property image search service is configured to access the enriched image metadata in response to a search query received from the user device.

7. The system of claim 6, wherein the property image search service is configured to correlate the enriched image metadata with the search query and output the image file for display on the user device.

8. The system of claim 1, wherein generating the enriched image metadata further comprises inserting copyright management information into the metadata field of the image file.

9. The system of claim 1, wherein the technical metadata of the image file includes Exchangeable Image File Format (EXIF) data.

10. A non-transitory computer-readable medium storing instructions that, when executed, configure at least one processor to perform operations comprising:
accessing property record information about a real estate property;
identifying that a user has uploaded an image file representing an image depicting the real estate property, the image file including image content data and metadata;
identifying that the user provided a keyword associated with the image file;
identifying, based on the keyword, a portion or element of the real estate property that is depicted in the image content data;
identify a metadata field of the metadata, wherein the metadata field embeds technical metadata relating to image capture into the metadata;
identifying a subset of the property record information that correlates with the portion or element of the real estate property that is depicted in the image content data;
generating enriched image metadata by appending the identified subset of the property record information in a machine readable format to the metadata field of the metadata of the image file, wherein generating the enriched image metadata comprises extracting existing technical metadata from the metadata field and appending the subset of the property record information to the existing technical metadata; and
saving the image file with image content data and the enriched image metadata;
wherein the image file comprises one of a plurality of frames along a timeline of a video depicting the real estate property, and the operations further include:
receiving a query for the keyword from a property image search engine of a real estate listing service;
accessing the enriched image metadata to identify the image file as a match to the query; and
returning the video with search results for the query, wherein the video in the search results is jumped to the image file.

11. The non-transitory computer-readable medium of claim 10, the operations further comprising:
receiving the keyword as a room category selection from a user uploading or viewing the image file; and
identifying the portion or element of the real estate property based on the room category selection.

12. The non-transitory computer-readable medium of claim 10, the operations further comprising:
identifying a string formed by appending the subset of the property record information to the existing technical metadata;
comparing a length of the string to a threshold;
in response to determining that the length of the string exceeds the threshold, trimming the string such that a trimmed length of the trimmed string does not exceed the threshold; and
generating the enriched image metadata using the trimmed string.

13. The non-transitory computer-readable medium of claim 10, the operations further comprising:

identifying a string formed by appending the subset of the property record information to the existing technical metadata;

comparing a length of the string to a threshold; and in response to determining that the length of the string does not exceed the threshold, generating the enriched image metadata using the string.

14. A computer-implemented method comprising:

accessing property record information about a real estate property;

identifying that a user has uploaded an image file depicting the real estate property, the image file including image content data and metadata;

identifying that the user provided a keyword associated with the image file;

identifying, based on the keyword, a portion or element of the real estate property that is depicted in the image content data;

identify a metadata field of the metadata, wherein the metadata field embeds technical metadata relating to image capture into the metadata;

identifying a subset of the property record information that correlates with the portion or element of the real estate property that is depicted in the image content data;

generating enriched image metadata by appending the identified subset of the property record information in a machine readable format to at least one field of the metadata of the image file, wherein generating the enriched image metadata comprises extracting existing technical metadata from the metadata field and appending the subset of the property record information to the existing technical metadata; and saving the image file with image content data and the enriched image metadata;

wherein the image file comprises one of a plurality of frames along a timeline of a video depicting the real estate property, and the method further comprises:

receiving a query for the keyword from a property image search engine of a real estate listing service;

accessing the enriched image metadata to identify the image file as a match to the query; and returning the video with search results for the query, wherein the video in the search results is jumped to the image file.

15. The computer-implemented method of claim 14, further comprising:

receiving the keyword as a room category selection from a user uploading or viewing the image file; and identifying the portion or element of the real estate property based on the room category selection.

16. The computer-implemented method of claim 14, further comprising delivering the video with the search results by jumping to a time on the timeline corresponding the image file.

* * * * *